No. 876,740. PATENTED JAN. 14, 1908.
B. W. SIMS.
DEVICE FOR ATTRACTING FLIES.
APPLICATION FILED SEPT. 13, 1907.
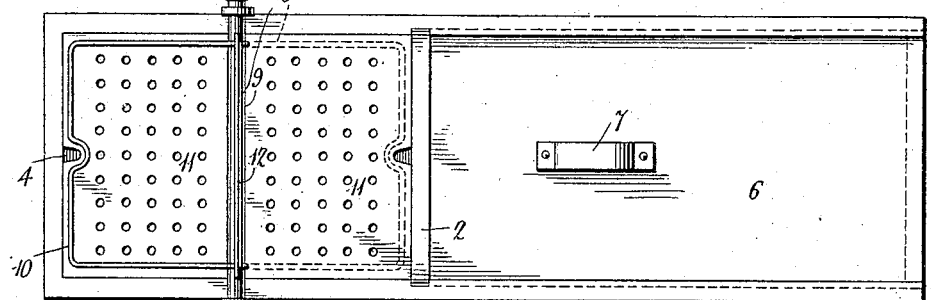
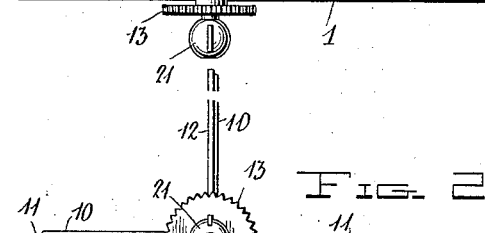
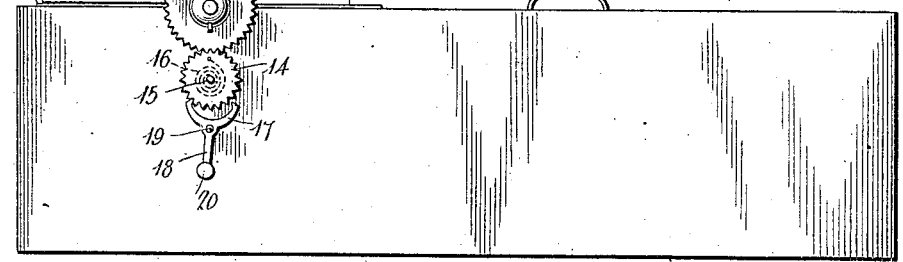
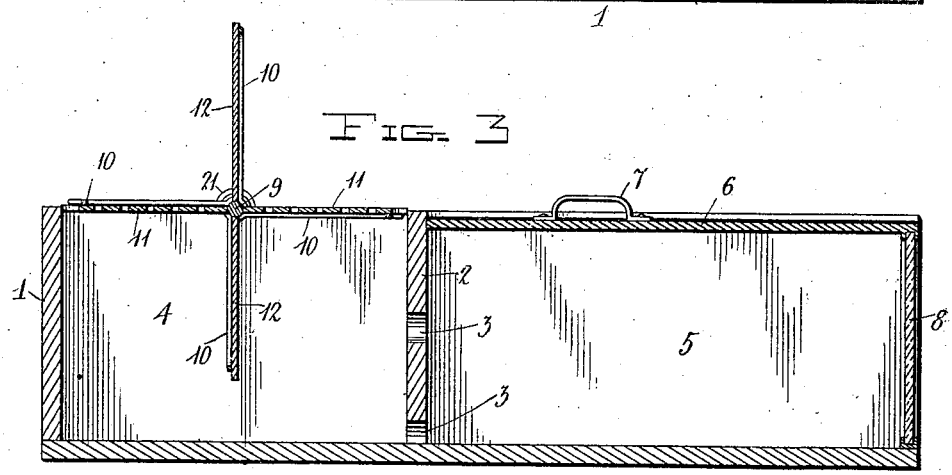
Witnesses
Inventor
Benjamin W. Sims
By Victor J. Evans
Attorney

UNITED STATES PATENT OFFICE.

BENJAMIN W. SIMS, OF WAXAHACHIE, TEXAS.

DEVICE FOR ATTRACTING FLIES.

No. 876,740.  Specification of Letters Patent.  Patented Jan. 14, 1908.

Application filed September 13, 1907. Serial No. 392,777.

*To all whom it may concern:*

Be it known that I, BENJAMIN W. SIMS, a citizen of the United States, residing at Waxahachie, in the county of Ellis and State of Texas, have invented new and useful Improvements in Devices for Attracting Flies, of which the following is a specification.

This invention relates to devices for attracting flies and one of the principal objects of the same is to provide a rotating bait holder mounted on a casing provided with a partition having apertures therein which lead into a light chamber so that the flies will seek the light and will pass from the dark into the light chamber.

Another object of the invention is to provide a bait support consisting of a shaft having a series of radial bait supports secured thereto and means for constantly rotating said bait supports so that flies lighting thereon will be deposited in the dark compartment and from which they will pass to a light chamber provided with a sliding top and glass end.

These and other objects may be attained by means of the construction illustrated in the accompanying drawing, in which:—

Figure 1 is a plan view of a device for attracting flies made in accordance with my invention. Fig. 2 is a side elevation of the same. Fig. 3 is a central longitudinal section of the same.

Referring to the drawing for a more specific description of my invention, the numeral 1 designates a box or casing provided with a partition 2, said partition having openings 3 therein and said partition dividing the box to provide a trap compartment 4 and a light compartment 5, said compartment 5 having a sliding top 6 provided with a handle 7 and a glass end 8 secured to said cover 6 and adapted to slide in keepers in the side edges of the casing.

A shaft 9 journaled on the upper edge of the casing is provided with four radially disposed wire bails, said wire bails being secured to the shaft 9. Connected to the bails 10 are bait holders 11 comprising perforated plates and intermediate the bait holders are wings 12 comprising imperforate plates. Connected to the shaft 9 is a gear wheel 13 which meshes with a gear wheel 14 mounted on a shaft 15 journaled in the side of the casing 1 and a convolute spring 16 surrounds the shaft 15 and is secured at one end thereto while the opposite end is secured to the gear wheel 14. A combined escapement verge 17 and a pendulum 18 is pivoted at 19 to the side of the casing, the pendulum being provided with a weighted end 20. The ends of the shaft 9 are provided with suitable enlargements 21 by means of which the spring 16 may be wound.

The operation of my invention may be briefly described as follows:—When the spring 16 has been wound and the bait applied to the opposite sides of the two bait holders 11 and the pendulum set in motion the bait holders will slowly revolve until the flies will be carried into the chamber 4 from which they will seek an outlet through the light openings 3 into the light chamber 5 from which they can be removed from time to time by sliding the cover 6.

Having thus described the invention, what is claimed as new, is:—

1. A device for attracting flies comprising a casing, a shaft mounted to rotate in said casing, radially disposed bait holders secured to said shaft, means for rotating said shaft and bait holders, a partition in said casing provided with openings and providing a chamber at one side of said partition, said chamber having a window and a removable cover.

2. A device for attracting flies comprising a casing having a partition therein, said partition being provided with openings, a shaft mounted to rotate on the upper edge of said casing, bait holders carried by said shaft, wings carried by said shaft at right angles to said bait holders, means for rotating said bait holders and wings, and a sliding cover having a window attached thereto, substantially as described.

In testimony whereof I affix my signature in presence of two witnesses.

BENJAMIN W. SIMS.

Witnesses:
T. J. FRIERSON,
R. B. ROUNTREE.